Aug. 31, 1943.  J. J. NEUMAN  2,328,397
THROW-AWAY PALLET
Original Filed May 22, 1940
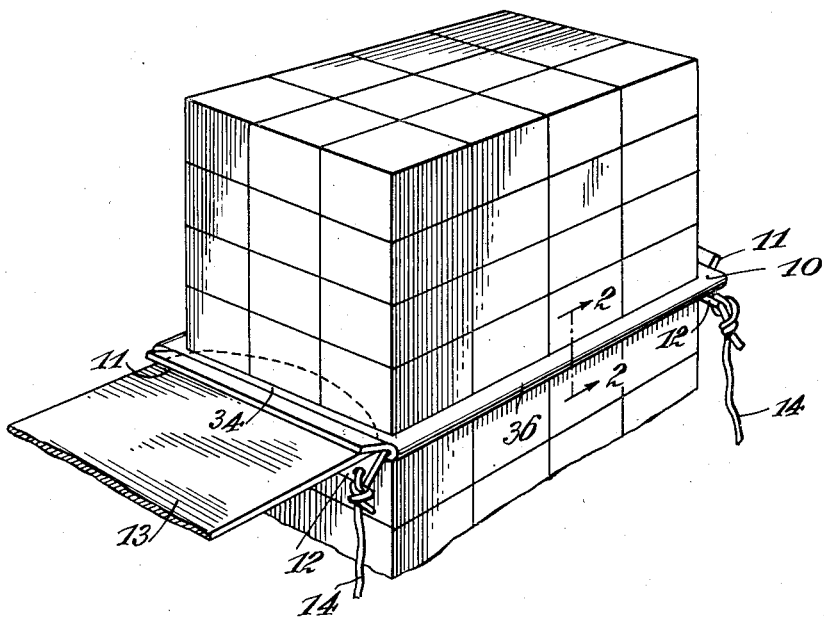
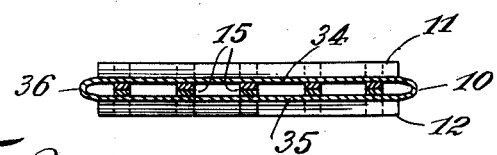
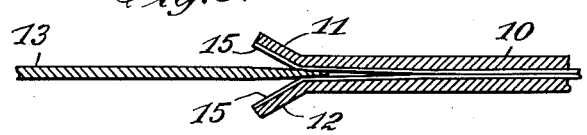
INVENTOR.
Jacob J. Neuman
BY C. P. Goepel
his ATTORNEY Patented Aug. 31, 1943

2,328,397

UNITED STATES PATENT OFFICE 2,328,397

THROW-AWAY PALLET

Jacob J. Neuman, South Salem, N. Y.

Original application May 22, 1940, Serial No. 336,682. Divided and this application March 23, 1942, Serial No. 435,823

7 Claims. (Cl. 214—10.5)

This invention relates to improvements in storage and shipping pallets and is a division of my co-pending application Serial No. 336,682, filed May 22, 1940, the present invention having for its object to provide a throw-away pallet for pallet storage and shipping by railroad car and truck, which is inexpensive and may be thrown away after it is worn out or damaged which may be after being used only once or after being used repeatedly.

At present, wooden pallets are used, which consist of two layers of boards spaced apart by several heavy wooden spacers to provide channels into which the forks of a lift truck may be freely inserted or withdrawn. Due to the necessity for sturdy construction to withstand constant use, such pallets are relatively expensive and even then are subject to considerable breakage and maintenance expense.

The conventional pallet system of handling and storage consists briefly of piling the articles of manufacture on the pallets which are then picked up by the fork truck and taken to the warehouse where they are stacked one on top of the other until time for shipment, when the fork truck again picks them up and takes them to the truck or railroad car. The articles are then manually removed from the pallets and again piled in the truck or freight car. This last step consumes considerable time and labor. With the improved throw-away pallet, the fork truck stacks the loaded pallets in the truck or feight car and they are shipped off with the rest of the load resulting in much faster loading and considerable savings.

It is, therefore, the primary object of this invention to provide a pallet the cost of which is low enough so that it may be used for the handling and storage of finished articles of manufacture prior to shipment and then be shipped off with its load in the railroad car or truck. The savings and advantages derived through the reduced handling costs and time saved in loading the cars and trucks by the throw-away pallet system more than equals the cost of the pallets and thus permits their use for only a single cycle of handling, storage and shipment.

A still further object is to provide the pallet with stabilizing means thus permitting higher stacking of pallets and more efficient use of storage space.

Another object is to provide a pallet which compared to the conventional wooden pallet is relatively flexible and thus better adapted to use with objects of irregular shape since this flexibility permits the bottom of the pallet to adjust itself to the irregularities of objects on pallets lower in the tier thereby distributing the load and providing the necessary stability.

With the foregoing and other objects in view, the invention will be more fully described hereinafter, and will be more particularly pointed out in the claims appended hereto.

In the drawing wherein I have illustrated my invention—

Figure 1 is a perspective view of the throw-away pallet in use showing how the pallet supporting member of the lift truck is inserted;

Figure 2 is a transverse section of the pallet on the line 2—2 of Figure 1, and

Figure 3 is a fragmentary enlarged transverse section of the pallet and pallet supporting member taken at right angles to Figure 2.

Referring to the drawing the pallet consists of an envelope or flattened tube 10 of fibre board open at both ends, the ends being flared apart to form lips 11 and 12. The envelope is lined with several longitudinally extending sheet metal strips 15 which extend the entire length of the pallet and to the edges of the lips 11 and 12 (best seen in Figures 2 and 3). These strips 15 serve to stiffen the pallet and provide a relatively non-friction metal to metal sliding contact with the pallet supporting member 13 of the lift truck.

The pallet supporting member of the lift truck consists of a steel plate 13 instead of the conventional forks. The end of the plate 13 is curved and sharpened and when it is desired to move the loaded pallet the plate 13 is inserted into the envelope 10 between the lips 11 and 12 which form a guiding means. Talc, graphite or other suitable lubricating means is used inside the envelope to aid easy insertion and withdrawal of the plate 13.

The corners of the lips 12 are provided with rope ties 14 for tying adjacent tiers of pallets together in the warehouse. This provides an effective means of stabilizing the stacks of pallets when they are piled high. These ties 14 may also be used if necessary to anchor the pallet when inserting or withdrawing the plate 13 in the case of relatively light loads.

In addition to the previously noted advantages, the use of the throw-away pallet eliminates the cost of maintenance and repairs experienced with conventional pallets. Due to the throw-away pallet being relatively thin, the height of piles in the warehouse is somewhat lessened providing greater stability. Costs of handling and storing empty pallets are eliminated because the throw-away pallets are only handled once, whereas after its load is removed the conventional pallet must be stored and then rehandled prior to loading. The throw-away pallet is relatively light in weight facilitating ease and speed of handling of the empties. Savings are realized due to the elimination of dunnage boards in the freight cars as the pallets themselves act as dunnage.

The upper wall 34 of the flexible pallet is connected with the lower wall 35 thereof by the end connecting walls or side member 36. Of course it is not essential that the walls 34 and 35 shall be formed out of a tube. This is merely one convenient method of forming a pallet in accordance with the present invention. It is sufficient that there be separable walls 34 and 35 which will move apart when the lifting member 13 is inserted in the space between these members 34 and 35. In other words the members 34 and 35 are adapted to move apart to provide a space in which to receive the lifting member 13. It is preferable to have a unitary construction of the pallet and for this reason some connecting means 36 between the plates 34 and 35 may be used.

The pallet member will preferably be wider or longer, or greater in one horizontal dimension than the similar dimension of the stack of articles supported on the pallet so as to leave a projecting part to which the rope tie or other connection 14 may be attached. It is also desirable to have the pallet of sufficient length so that the lips 11 and 12 will not receive the weight of the articles and will therefore be beyond the vertical line which coincides with the side walls of the stacks of the articles.

It is obvious that various changes and modifications may be made in the details of construction and design of the above specifically described embodiment of this invention without departing from the spirit thereof, such changes and modifications being restricted only by the scope of the following claims.

What is claimed is:

1. An improved pallet comprising upper and lower separable walls, means to flexibly connect said walls to permit the walls to separate when a lifting member is inserted between said walls.

2. An improved pallet comprising a flattened envelope of fibre board having upper and lower separable walls with flexible side portions between said walls, said pallet having a space between said upper and lower walls open at one end of the pallet, said walls having oppositely flaring lips at the open end of the pallet to receive and guide into said space a lifting member, and pairs of metallic strips in said space between said upper and lower walls also having flaring lips and on which the lifting member is received and moved into and out of said space.

3. A pallet construction including a collapsible tubular member providing a pair of load-supporting walls disposed in face-to-face relationship and adapted to move apart upon insertion therebetween of a lifting member.

4. A pallet construction including a pair of load-supporting walls disposed in face-to-face relationship and collapsible means connecting said load-supporting walls together at the sides of the pallet to permit said load-supporting walls to spread apart upon insertion therebetween of a lifting member.

5. A pallet construction including a pair of load-supporting walls disposed in face-to-face relationship and composed of relatively flexible material to adapt said walls to irregularities in load surfaces, and collapsible means connecting said load-supporting walls together at the sides of the pallet to permit said load-supporting walls to spread apart upon insertion therebetween of a lifting member.

6. A pallet construction including means arranged to provide a pair of load-supporting walls disposed in face-to-face relationship and flexibly connected together at the sides thereof to permit said load-supporting walls to spread apart upon insertion therebetween of a lifting member, and friction reducing means on the inner surfaces of said load-supporting walls to facilitate insertion of the lifting member.

7. A collapsible pallet construction including a pair of load-supporting walls disposed in face-to-face relationship and flexibly connected together at the sides thereof to permit said walls to spread apart upon insertion therebetween of a lifting member, and reinforcing means for said load-supporting walls arranged along the inner surfaces of the latter.

JACOB J. NEUMAN.